(12) United States Patent
Nam

(10) Patent No.: US 7,991,390 B2
(45) Date of Patent: Aug. 2, 2011

(54) PROGRAM UPDATING METHOD OF WIRELESS COMMUNICATION TERMINAL AND WIRELESS COMMUNICATION TERMINAL USING THE SAME

(75) Inventor: Ki-Yong Nam, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 666 days.

(21) Appl. No.: 11/847,161

(22) Filed: Aug. 29, 2007

(65) Prior Publication Data

US 2008/0064382 A1   Mar. 13, 2008

(30) Foreign Application Priority Data

Sep. 8, 2006   (KR) .................. 10-2006-0087072

(51) Int. Cl.
*H04M 3/00*      (2006.01)
*G06F 9/00*      (2006.01)
*G06F 15/177*    (2006.01)

(52) U.S. Cl. .............................. 455/418; 455/419; 713/2

(58) Field of Classification Search ........... 455/418–419
See application file for complete search history.

(56) References Cited

U.S. PATENT DOCUMENTS

| | | | |
|---|---|---|---|
| 6,314,532 B1 | 11/2001 | Daudelin et al. | |
| 6,993,650 B2 | 1/2006 | Landers, Jr. et al. | |
| 2002/0055355 A1* | 5/2002 | Ikeda ........................... | 455/419 |
| 2002/0092010 A1* | 7/2002 | Fiske ........................... | 717/168 |
| 2003/0167373 A1* | 9/2003 | Winters et al. ................ | 711/103 |
| 2004/0092255 A1* | 5/2004 | Ji et al. ......................... | 455/419 |

FOREIGN PATENT DOCUMENTS

| | | |
|---|---|---|
| KR | 1020040008007 | 1/2004 |
| KR | 1020040083236 | 10/2004 |
| KR | 1020050119035 | 12/2005 |
| KR | 1020060025854 | 3/2006 |
| KR | 1020060087215 | 8/2006 |
| KR | 1020060133709 | 12/2006 |

* cited by examiner

*Primary Examiner* — Erika A Gary

*Assistant Examiner* — Michael Mapa

(74) *Attorney, Agent, or Firm* — The Farrell Law Firm, P.C.

(57) ABSTRACT

A wireless communication terminal and program updating method are provided. The method downloads a binary file from a host computer to update a program. The method includes determining, if the wireless communication terminal is booted, whether the wireless communication terminal is in a binary file download mode or if the wireless communication terminal has been rebooted by generation of an undesired event; and if so, setting a start position for downloading the binary file according to the number of occurrences of the undesired event. Thereafter, even when downloading is interrupted by an undesired event, downloading is performed from a position at which it was interrupted, not from the start position of the file, so that the time required for downloading the file can be reduced.

8 Claims, 2 Drawing Sheets

PROGRAM UPDATING METHOD OF WIRELESS COMMUNICATION TERMINAL AND WIRELESS COMMUNICATION TERMINAL USING THE SAME

PRIORITY

This application claims priority to an application entitled "PROGRAM UPDATING METHOD OF WIRELESS COMMUNICATION TERMINAL AND WIRELESS COMMUNICATION TERMINAL USING THE SAME" filed in the Korean Intellectual Property Office on Sep. 8, 2006 and assigned Serial No. 2006-87072, the contents of which are incorporated herein by reference.

BACKGROUND OF THE INVENTION

1. Field of the Invention

The present invention relates to a wireless communication terminal, and more particularly, to a wireless communication terminal and program updating method.

2. Description of the Related Art

Wireless communication devices such as Wireless phones and Personal Digital Assistants (PDAs) are widely used as an important communication device. Wireless communication devices have recently incorporated various functions and characteristics, and requirements for technical flexibility for compatible operation between the devices have increased. For this reason, the architecture of the wireless communication devices requires complicated programs to meet both the users and technical requirements. Initial programming of the devices is performed during the process of manufacturing when the device is generally programmed with basic characteristics and data commonly applied to the same type of devices. Subsequent programming is performed to reflect regional requirement or a user's specific requirement, for example, to use another provider's network.

In some cases, it is required to update the program of the wireless communication device. For example, a new function that has been not previously used needs be added or a program correcting an error should be updated. Under all circumstances, the updating process should be performed conveniently and reliably.

However, in conventional program updating methods, when the process of downloading a program is interrupted by an undesired event such as power off, battery removal, or signal reception failure, rebooting of the wireless communication device is often required. In this case, the program is not updated and downloading the file should be performed again.

SUMMARY OF THE INVENTION

In an effort to solve the above problems, an object of the present invention is to provide a wireless communication terminal and program updating method that can prevent loss or damage of a binary file when downloading of the binary file is interrupted by an undesired event.

Another object of the present invention is to provide a wireless communication terminal and program updating method that can be used safely and conveniently even if an undesired event occurs in the process of downloading the binary file to update a program of the wireless communication terminal by controlling the position where downloading of the binary file is interrupted and the restart of the wireless communication terminal.

In accordance with an aspect of the present invention, the above and other objects are accomplished by a program updating method that downloads a binary file from a host computer to update the program resident in the wireless communication terminal.

The method includes determining whether the wireless communication terminal is in a binary file download mode, if the wireless communication terminal is booted; determining whether the wireless communication terminal has been rebooted by generation of an undesired event if the wireless communication terminal is in the binary file download mode; and setting a start position for downloading of the binary file according to the number of times the undesired event occurs, if the wireless communication terminal has been rebooted by generation of an undesired event.

Preferably, setting a start position for downloading includes determining if the number of downloading interruptions is greater than a critical value; and outputting an error message and restoring the existing binary file if the number of downloading interruptions is greater than the critical value.

Preferably, setting the start position for further downloading includes, erasing the binary file downloaded up to the point of interruption, detecting the interruption position of the downloading process and setting a start position, if the number of downloading interruptions is not greater than the critical value.

Preferably, the method further includes setting a start position for downloading of the binary file to the first part of the binary file, if the wireless communication terminal has not been rebooted by generation of a predetermined event. Preferably, the method further includes determining if the size of the binary file is greater than an allowable storage space; and storing the binary file in the storage space, if the size of the binary file is not greater than the allowable storage space. furthermore the method includes compressing the binary file, if the size of the binary file is greater than the allowable storage space.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Figure 1:
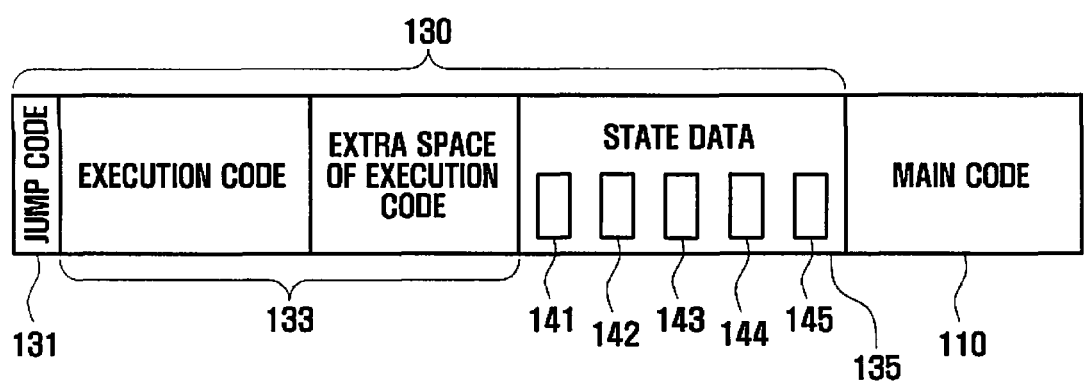
FIG. 1 is a block diagram illustrating a memory map of a boot loader for updating a program of a wireless communication terminal according to the present invention.

Preferred embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

While the present invention may be embodied in many different forms, specific embodiments are shown in drawings and are described herein in detail, with the understanding that the present disclosure exemplifies the principles of the invention and is not intended to limit the invention to the specific embodiments illustrated therein.

A wireless communication terminal according to a preferred embodiment of the present invention includes a backup system for storing and preparing a binary file for updating a program when storage space is sufficient and downloading of the file is completed, a state restoring system for storing a downloading state of the file and restoring the state using the stored downloading state information when an undesired event occurs, and a safety monitoring system for performing rebooting of the wireless communication terminal if required.

The backup system compares the binary file size with the allowable storage space of the wireless communication terminal. The file size is calculated before downloading the binary file; if the file size is smaller than the allowable storage space of the wireless communication terminal, the file is stored in the program memory of the wireless communication terminal. The backup system updates the corresponding file that has been stored in the program memory of the wireless communication terminal after downloading of the file is completed.

The state restoring system enables downloading to be continued from the end position of the downloaded file when the wireless communication terminal is rebooted or the downloading is restarted by an undesired event by periodically storing the downloading state in the memory while downloading the binary file.

The safety monitoring system monitors the wireless communication terminal, reboots the wireless communication terminal, if downloading of the binary file is interrupted and instructs the state restoring system to restore the file.

In general, the wireless communication terminal includes a Radio Frequency (RF) unit, a boot loader for updating the program in addition to a wireless communication service and additional services, a controller for performing the control function for state restoration and safety monitoring, a memory unit for storing the wireless communication program and a binary file downloaded to update the program, a key input unit for inputting the instructions for operating the downloaded file to update the program or various other files, and a connection unit for connecting to a host PC or other external devices to download the binary file for updating the program. The wireless communication terminal may further include a display unit for informing the state of the wireless communication terminal when an undesired event occurs during downloading of a program.

When the wireless communication terminal is booted, the boot loader loads a program to be first executed by the controller. It is checked if allowable storage space exists in the memory to update and store the program by the boot loader.

As shown in FIG. 1, the boot loader includes a main code area 110, in which codes of the file are stored, and a downloader area 130.

Downloader area 130 includes a jump code 131 for jumping to the main code area 110 when the downloader does not operate, an execution code 133 for executing the download, and a state data area 135 for storing the downloading state. State data area 135 includes, for example, downloader version information 141, downloader state information 142, download progress information 143, download related flag 144, and an address 145 of a temporary storage.

According to the kind of wireless communication terminal, when a file cannot be stored in code and boot areas of the memory, the wireless communication terminal may have separate file storage space.

When executing jump code 131, the controller determines whether the operating state is booting or rebooting. The state is booting if the wireless communication terminal is in a binary file download mode. The state is rebooting if the disruption of downloading were occasioned by an undesired event during downloading of the binary file. The controller allows the downloader of the wireless communication terminal to control or performs general booting accordingly.

If downloading is started, the wireless communication terminal may be rebooted when it is disabled by the controller activating the monitoring module. During downloading, the number of rebooting occurrences is stored and if rebooting is performed more than a predetermined number of times, the wireless communication terminal informs the user that downloading is impossible.

If the wireless communication terminal is in a rebooted state, the controller restores the existing downloading file and instructs the host PC to download from the position at which the downloading was interrupted. If it is impossible for the host computer to download from the interrupted position, the controller restarts to download from the starting position, restores the existing binary file, or informs that the downloading is impossible.

Once downloading is started, the controller stores in memory information such as a current number of booting occurrences, and if it is a rebooting operation during downloading, and checks whether space to store the binary file exists in memory if downloading is performed for the first time. If the storage space is sufficient, the binary file is stored in the corresponding space of memory. If the storage space is insufficient, the binary file is stored in a compressed form, and the storage form and date of the binary file are stored in a File Association Table (FAT) or a header.

The controller periodically stores the current download progress state in memory and automatically reboots the wireless communication terminal by the monitoring module and restores the download progress state if the wireless communication terminal is disabled during downloading of the binary file.

If downloading ends, the controller removes download progress state data and subsequent processes are performed. If the binary file were downloaded in a compressed state in the allowable space, the file is decompressed and sent to the actual storage position of memory.

Figure 2:
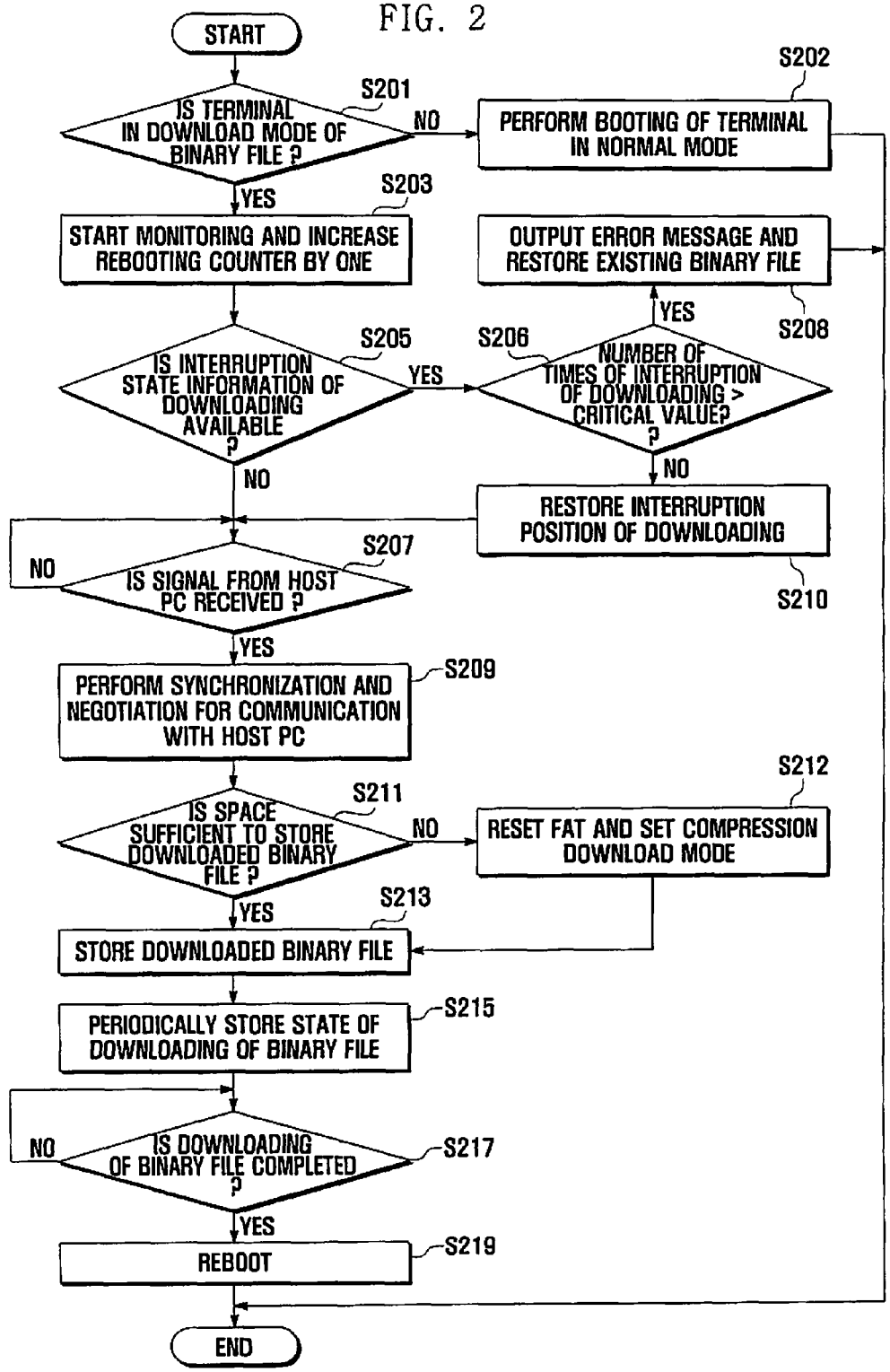
FIG. 2 is a flowchart of a program updating method of the wireless communication terminal according to the present invention.

Referring to FIG. 2, when the wireless communication terminal is booted, the controller determines if the wireless communication terminal is in a binary file download mode in step S201. If the wireless communication terminal is not in a binary file download mode, the controller performs booting of the wireless communication terminal in the normal mode in step S202, and if the wireless communication terminal is in a binary file download mode, the controller activates the monitoring module and increases the rebooting counter by one in step S203. The controller determines if interruption state information of downloading is available by searching state data area 135 of the memory in step S205. If interruption state information of downloading is unavailable, the controller determines if the signal is received from the host PC in step S207, and if a signal is received from the host PC, the controller performs synchronization and negotiation for communication with the host PC in step S209. If interruption state information of downloading is available at step S205, the controller determines if the number of interruption occurrences of downloading is greater than a predetermined critical value in step S206, and if the number of interruption occurrences of downloading is greater than a predetermined critical value, the controller outputs an error message to a display unit and restores the existing binary file in step S208. If the number of interruption occurrences of downloading is not greater than the predetermined critical value, the controller restores the interruption position of the downloading in step S210, and then performs step S207. The critical value, which is one of natural numbers, limits the number of rebooting times. Manufacturer may set the critical value, and/or user can customize the setting of the critical value manually.

The controller determines if the space to store the downloaded binary file is sufficient in step S211, and if the space to store the downloaded binary file is sufficient, the controller stores the downloaded binary file in the corresponding storage space of memory in step S213 and periodically stores the state of the downloaded binary file in step S215. The controller determines if downloading of the binary file is completed in step S217, and when downloading of the binary file is completed, the controller reboots the wireless communication terminal in step S219.

If the space to store the downloaded binary file is insufficient at step S211, the controller resets the FAT, sets the compression download mode in step S212, and then performs step S213.

As described above, in the program updating method of a wireless communication terminal according to the present invention, even if downloading of a binary file is interrupted by an undesired event, the downloading is performed from the position at which downloading was interrupted, not from the start position of the file, so that the time required for downloading the file can be reduced.

Further, in the process of downloading the file, if the wireless communication terminal is disabled, the wireless communication terminal is automatically rebooted and if the number of rebooting occurrences exceeds a predetermined value, downloading is interrupted and the existing file is restored so that even in the worst case of repeated downloading failure, power consumption due to continuous downloading of the file can be prevented.

Further, if the allowable storage space exists in the memory of the wireless communication terminal, downloading of the file is first performed in the corresponding part of the memory and thus the existing binary file is stored, so that the existing file can be restored even if the downloading fails.

Although preferred embodiments of the present invention have been described in detail hereinabove, it should be clearly understood by those skilled in the present art that many variations and modifications of the basic inventive concepts herein taught may still fall within the spirit and scope of the present invention, as further defined by the appended claims.

What is claimed is:

1. A program updating method of a wireless communication terminal that downloads a binary file from a host computer, comprising:
   determining, if the wireless communication terminal is booted, whether the wireless communication terminal is in a binary file download mode;
   determining, if the wireless communication terminal is in the binary file download mode, whether the wireless communication terminal has been rebooted by generation of an undesired event;
   setting, if the wireless communication terminal has been rebooted by generation of the undesired event, a start position for downloading of the binary file according to the number of occurrences of the undesired event; and
   storing the downloaded binary file according to the number of occurrences of the undesired event,
   wherein setting the start position for downloading comprises:
      determining whether the number of interruptions of downloading is greater than a critical value; and
      issuing an error message and restoring an existing binary file, if the number of downloading interruptions is greater than the critical value and erasing the binary file downloaded up to the point of interruption of the downloading.

2. The program updating method of claim 1, wherein the undesired event interrupts downloading of the binary file.

3. The program updating method of claim 1, wherein setting a start position for downloading further comprises detecting an interruption position of the downloading and setting the position to a start position of the downloading, if the number of interruptions of downloading is not greater than a critical value.

4. The program updating method of claim 1, further comprising setting a start position for downloading of the binary file to the first part of the binary file if the wireless communication terminal has not been rebooted by generation of the undesired event.

5. The program updating method of claim 1, wherein the storing the downloaded binary file further comprises determining if a size of the binary file is greater than an allowable storage space; and
   storing the binary file in the storage space if the size of the binary file is not greater than the allowable storage space.

6. The program updating method of claim 5, further comprising compressing the binary file if the size of the binary file is greater than the allowable storage space.

7. A wireless communication terminal that downloads a binary file from a host computer to update a program, comprising:
   a mode determining unit for determining, if the wireless communication terminal is booted, whether the wireless communication terminal is in a binary file download mode;
   a rebooting determining unit for determining, if the mode determining unit determines that the wireless communication terminal is in a binary file download mode, whether the wireless communication terminal has been rebooted by generation of an undesired event; and
   a start position setting unit for setting a start position for downloading of the binary file according to the number of occurrences of the undesired event, if the rebooting determining unit determines that the wireless communication terminal has been rebooted by generation of the undesired event;
   a memory unit for storing the downloaded binary file according to the number of occurrences of the undesired event,
   wherein the start position setting unit comprises:
      a first comparison unit for determining if the number of downloading interruptions is greater than a critical value; and
      a restoring unit for issuing an error message and restoring the existing binary file, if the number of times of downloading interruptions is greater than a critical value and erasing the binary file downloaded up to the point of interruption of the downloading.

8. The wireless communication terminal of claim 7, wherein the undesired event interrupts an operation during downloading of the binary file.

* * * * *